United States Patent [19]

Nishino et al.

[11] 3,959,021

[45] May 25, 1976

[54] NOVEL MANGANESE DIOXIDE

[75] Inventors: Atsushi Nishino, Neyagawa; Hiroshi Kumano, Daito; Yoshinori Noguchi; Kazunori Sonetaka, both of Kadoma; Yasuji Amano, Hirakata, all of Japan

[73] Assignee: Matsushita Electric Industrial Co., Ltd., Osaka, Japan

[22] Filed: Jan. 3, 1974

[21] Appl. No.: 430,521

Related U.S. Application Data

[63] Continuation-in-part of Ser. No. 208,993, Dec. 16, 1971.

[30] Foreign Application Priority Data

Dec. 29, 1969 Japan.................................... 45-766
Dec. 29, 1969 Japan.................................... 45-767

[52] U.S. Cl................................ 136/138; 423/605; 204/83

[51] Int. Cl.².................... H01M 4/50; C01G 45/02
[58] Field of Search............ 136/138, 139; 423/605, 423/49; 204/83

[56] References Cited
UNITED STATES PATENTS
3,533,740   10/1970   Grund et al........................... 423/49

*Primary Examiner*—John H. Mack
*Assistant Examiner*—H. A. Feeley
*Attorney, Agent, or Firm*—Stevens, Davis, Miller & Mosher

[57] ABSTRACT

Manganese dioxide obtained at the cathode by electrolyzing a hydrochloric acid-acidified aqueous manganese chloride solution with a specific current efficiency is high in oxygen content and extremely active as a depolarizer for cells.

2 Claims, 12 Drawing Figures

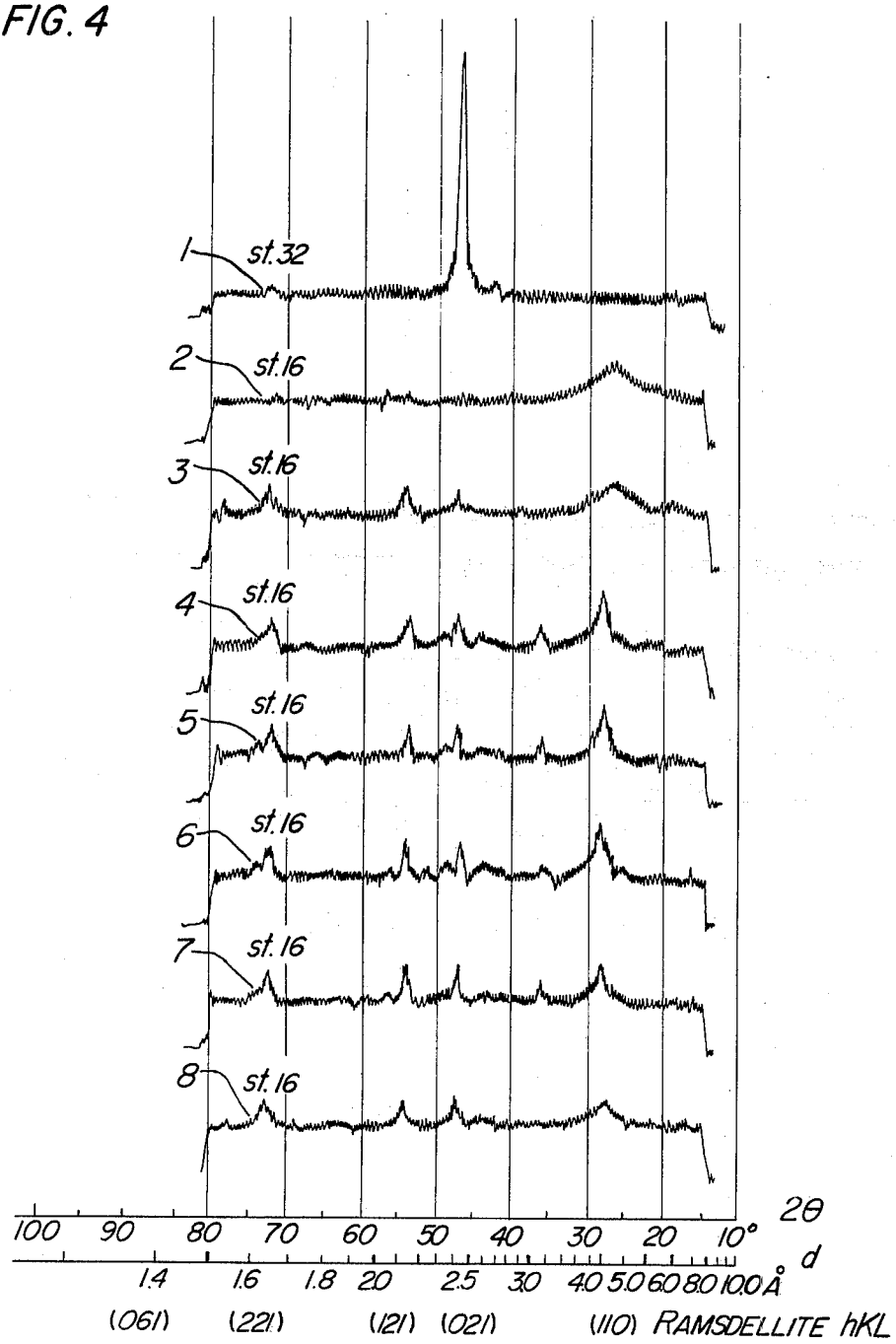

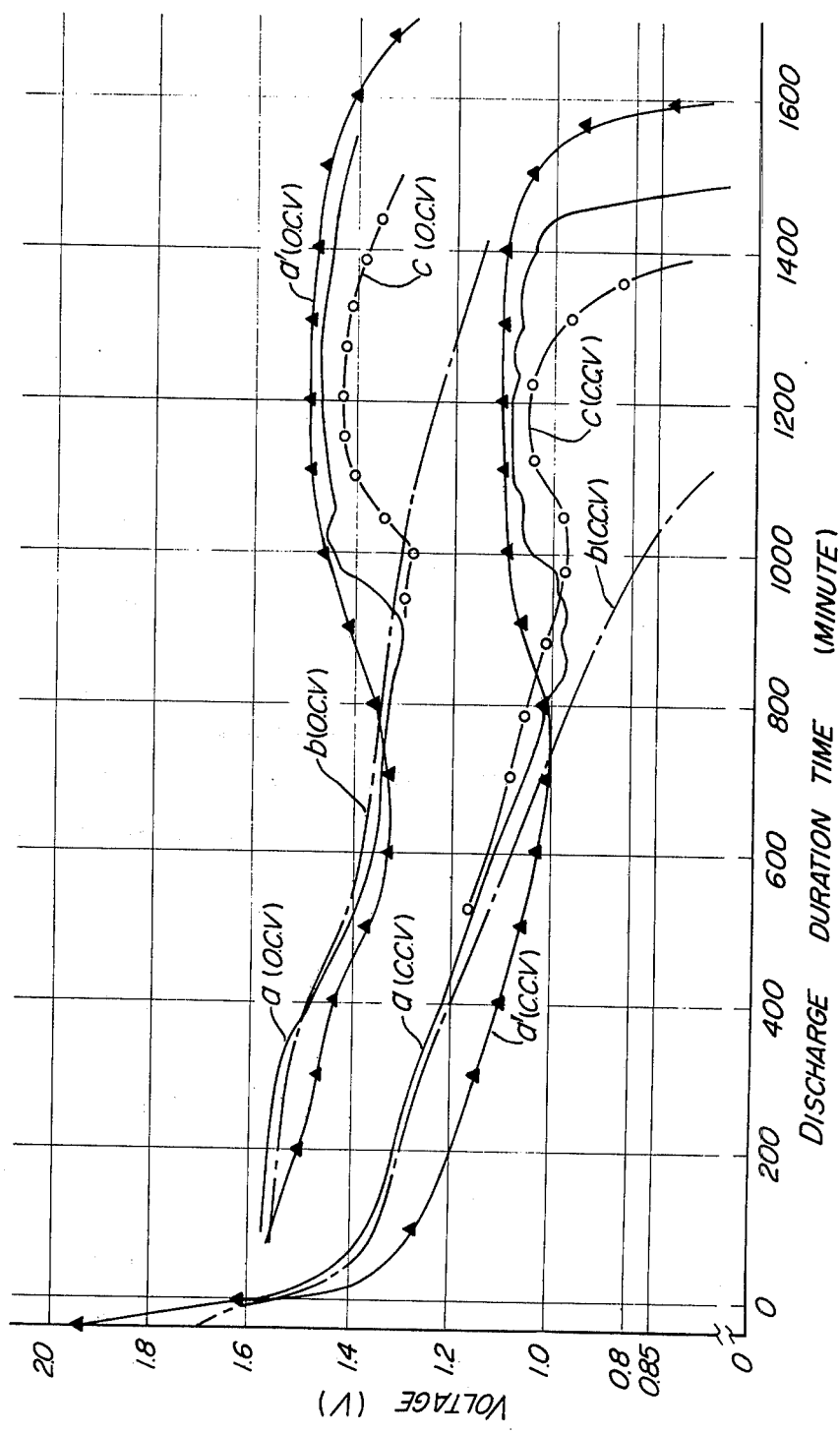

NOVEL MANGANESE DIOXIDE

This is a Continuation-In-Part application of Ser. No. 208,993 filed on Dec. 16, 1971.

This invention relates to novel manganese dioxide excellent in crystallinity, chemically active and high in effective oxygen content and containing chlorine ion in its crystal.

Heretofore, electrolytic manganese dioxide has been produced by anodic oxidation using as electrolyte a manganese sulfate solution obtained by calcining rhodochrosite or natural ore and lixivating and purifying the calcination product with sulfuric acid. The manganese dioxide obtained according to the said process is a powdery polycrystal of $\gamma$-$MnO_2$ and contains about 89 to 91 % of effective oxygen.

Manganese dioxide, which is high in content of effective oxygen among the conventional manganese dioxides, is $\beta$-$MnO_2$. This manganese dioxide, however, is not active as a depolarizer for cells. Further, though the electrolytic manganese dioxide obtained according to the conventional process requires, at the time of production, a quantity of electricity of 2 Faradays per mole of manganese dioxide and, when used as a depolarizer for cells, 1 Faraday per mole of manganese dioxide, and the discharge utilization efficiency thereof is 35 to 65 % when the quantity of electricity is 1 Faraday, though said ratio varies depending on the discharge rate. This is considered ascribable to the fact that the conventional electrolytic manganese dioxide is a powdery polycrystal, so that the crystal particles thereof are high in resistance at the crystal interface. The discharge reaction of manganese dioxide is represented by the equation $2MnO_2 + 2H^+ + 2e \rightarrow Mn_2O_3 \cdot H_2O$. This equation shows that the discharge is effected by solid phase diffusion of hydrogen ions. It is therefore considered that the higher the single crystallinity of manganese dioxide crystal, the quicker becomes the reaction to make the utilization ratio higher.

Recently, the uses of dry cells have been broadened, and the development of high power cells usable for many purposes have been required. However, to increase the discharge capacity of cells by increasing the amount of depolarizing mixture is difficult since the cells are definite in volume and, in order to make the cells higher in capacity, it is necessary to develop a manganese dioxide which is higher in activity and greater in utilization efficiency.

The present inventors previously proposed a process for producing manganese dioxide having a new orientation by using a manganese chloride electrolyte.

An object of the invention is to provide manganese dioxides which are high in content of effective oxygen, high in chemical activity, excellent in crystallinity, great in discharge utilization efficiency, and effective as depolarizer for cells.

The manganese dioxide of the present invention can be used, as a cathode depolarizer of Leclanche Cells and primary and rechargeable cells which use caustic alkali as an electrolyte and zinc as an anode.

The manganese dioxides of the present invention are of the $\gamma$-form, but the physico-chemical and electrochemical properties thereof are markedly different from those of $\gamma$-$MnO_2$, which is obtained according to the conventional process. For convenience, therefore, they are referred to as $\gamma_L$-$MnO_2$ and $\gamma_T$-$MnO_2$, hereinafter. Table 1 shows a comparison in principal properties between the manganese dioxides according to the present invention and the conventional $\gamma$-$MnO_2$.

Table 1

| Properties<br>Crystal form | Effective oxygen (%) | Value of X of $MnO_x$ | Characteristics |
|---|---|---|---|
| $\gamma$-$MnO_2$ | 88 – 91.5 | 1.940 – 1.957 | Powdery polycrystal. |
| $\gamma_L$-$MnO_2$ | 90 – 94 | 1.950 – 1.970 | Directional, similar in structure to fibers, and high in activity. Containing some amount of chlorine |
| $\gamma_T$-$MnO_2$ | 94 – 98.5 | 1.970 – 1.990 | Directional, and high in oxidation degree and utilization efficiency. Containing some amount of chlorine |

The process for production of manganese dioxide of the present invention is explained below.

The electrolysis conditions employed are as follows:

| | | | |
|---|---|---|---|
| Hydrochloric acid concentration | 0.01 to 1.0 mole/l. | (I) | |
| Manganese chloride concentration | 0.2 to 6.0 mole/l. | (II) | (1) |
| Bath temperature | 70° to 99°C | (III) | |
| Current density | 0.3 to 5A/dm² | (IV) | |
| Apparent current efficiency | 60 to 102 % | (V) | |

An apparent current efficiency of 108 % corresponds to the true current efficiency 100 %. The apparent density is decided by taking water content and the purities of manganese salt and manganese dioxide into consideration. The electrodes used should be resistant to hydrochloric acid. The anode is required to be higher in resistance to hydrochloric acid. The cathode and anode are graphite electrodes, in general. As the anode, platinum-plated titanium may also be used, though this is expensive.

In the above, when the conditions (I) to (IV) are decided, the condition (V) is automatically decided and, when the condition (V) is decided, the conditions (I) to (IV) are decided. By the combination of such conditions, $\gamma_L$-$MnO_2$ and $\gamma_T$-$MnO_2$ are obtained.

Among the above-mentioned conditions, the hydrochloric acid concentration is limited to 0.01 to 1.0 mole/l. for such reasons that to control the said concentration to less than 0.1 mole/l. is extremely difficult and is not economical from the industrial standpoint, and that the adoption of a concentration of more than 1.0 mole/l. is not desirable in view of the corrosion resistance of electrolytic apparatuses and equipments, though electrolysis is possible at said concentration.

If the manganese chloride ($MnCl_2$) concentration becomes less than 0.2 mole/l., the current efficiency is greatly lowered to narrow the permissibility of electrolysis conditions. On the other hand, the adoption of a manganese chloride concentration of more than 6.0 mole/l. is not preferable since the utilization efficiency of ores is lowered in case the preparation of manganese chloride solution has been effected according to a lixiviation method using an acid.

Even if the bath temperature is below 70°C, electrolysis can sufficiently be effected. However, the adoption of such a low bath temperature is not economical from the industrial standpoint, because the anode over-voltage becomes unnecessarily high, the current density is required to be considerably lowered, and the electrodeposition of manganese dioxide low in bulk density is brought about.

Even when the current density is less than 0.3 A/dm$^2$, electrolysis is possible. In this case, however, the productivity per cell becomes low to bring about economical disadvantages. If the current density becomes more than 5 A/dm$^2$, the consumption of electrodes becomes marked, the current efficiency is greatly lowered and the crystallinity of the resulting manganese dioxides becomes uneven.

As $SO_4^{--}$ is contained in manganese dioxide when the conventional manganese sulfate bath is electrolyzed, $Cl^-$ is inevitably contained in $MnO_2$ when manganese chloride bath is electrolyzed. It seems that this $Cl^-$ is adsorbed to manganese dioxide and thus contained therein. When electrolysis is carried out under said conditions (1), 0.5 – 1.0 % by weight of $Cl^-$ is contained in manganese dioxide. PH value of manganese dioxide at this state is about 1.5. Such manganese dioxide has corroding action due to $Cl^-$ and when it is used as, e.g., a depolarizer in a dry cell, it corrodes zinc anode to cause self-discharge of the cell and generation of hydrogen gas. Therefore, when said manganese dioxide is used as a depolarizer of a dry cell, it is subjected to deoxidation treatment with an alkali such as sodium carbonate or ammonia. Such manganese dioxide as containing 0.05 – 0.3 % of $Cl^-$ and having a pH of about 4.5 which are attained by said treatment is suitable as a depolarizer. The reaction of the deoxidation treatment is as follows:

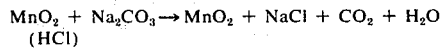

$$MnO_2 + Na_2CO_3 \rightarrow MnO_2 + NaCl + CO_2 + H_2O$$
$$(HCl)$$

When the manganese oxide of this invention is used as a catalyst, it is also preferred to subject it to the deoxidation treatment.

The aforesaid $\gamma_L$-$MnO_2$ and $\gamma_T$-$MnO_2$ are electrodeposited simultaneously. The electrolysis conditions adopted are decided by the combination of the aforesaid conditions (1).

Typical examples thereof are explained below with reference to the accompanying drawings, in which:

FIG. 4 is a diffraction pattern for conventional electrolytic $\gamma$-$MnO_2$ produced from manganese sulfate solution;

FIG. 7 illustrates the 4 Ω-intermittant discharge curves of the UM-1 type dry cells at 20°C;

Figure 8A:
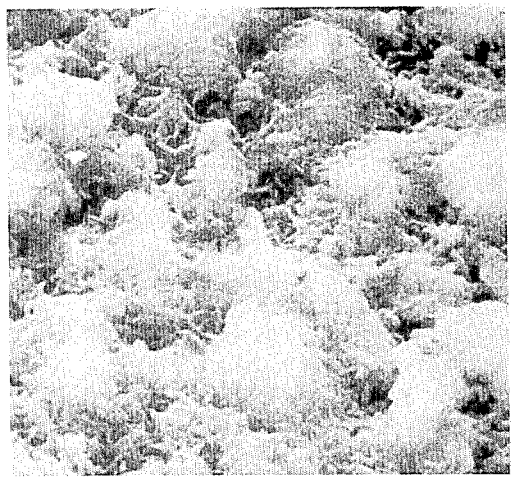
Figure 8A:
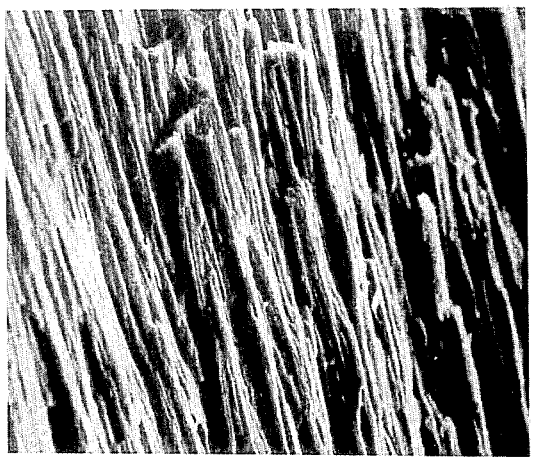
Figure 8B:
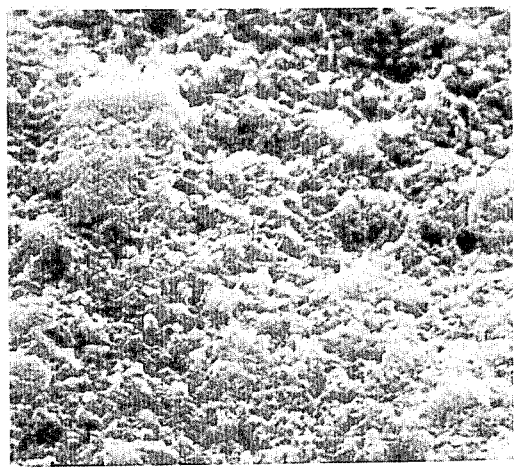
Figure 8B:
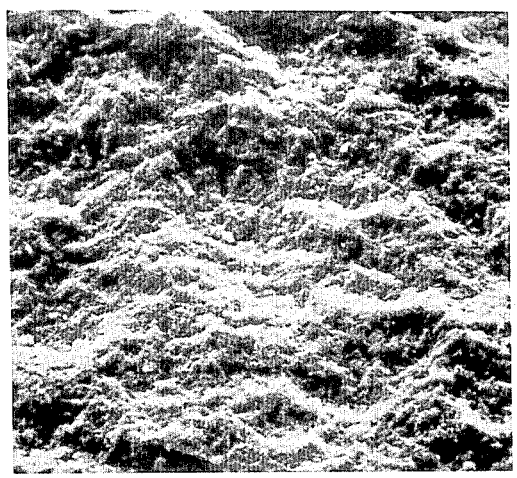

FIG. 8A and 8A' are electron photomicrographs of $\gamma_L$-$MnO_2$ block electrodeposited on an electrode; and FIG. 8B and 8B' are electron photomicrographs of conventional $\gamma$-$MnO_2$ block electrodeposited by electrolysis from a manganese sulfate bath.

Figure 1:
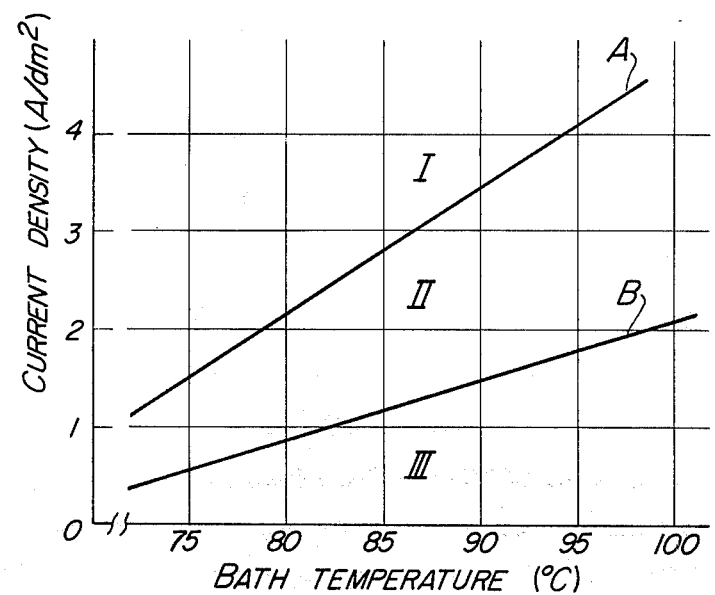
FIG. 1 illustrates the relation between current density and the bath temperature.

FIG. 1 shows the relation between the current density, the bath temperature and the apparent current efficiency under the conditions that the $MnCl_2$ concentration is 1.0 mole/l. and the HCl concentrations is 0.4 N. The lines A and B are isocurrent efficiency lines showing that the apparent current efficiencies under said conditions are 75 % and 102 %, respectively. Under the conditions in regions I, II and III which are sectioned by the lines A and B, there are obtained $\gamma_L$-$MnO_2$ or mixtures of $\gamma_L$-$MnO_2$ and $\gamma_T$-$MnO_2$. Table 2 shows the proportions of $\gamma_T$-$MnO_2$ and $\gamma_L$-$MnO_2$ which are obtained under the conditions in said regions I, II and III.

Table 2

| Region | I | II | III |
|---|---|---|---|
| $\gamma_T$-$MnO_2$ | More than 20 | 0 to 20 | 0 |
| $\gamma_L$-$MnO_2$ | Less than 80 | 80 to 100 | 100 |
| Apparent current efficiency | Less than 75 | 75 to 102 | 102 to 108 |

In FIG. 1, uneveness of the apparent current efficiency is in the range of ± 5 % in the case of the line A, and in the range of ± 2 % in the case of the line B. Factors resulting in such uneveness are differences in kind of materials of the electrodes such as graphite and the like and in surface state of the electrodes.

Figure 2:
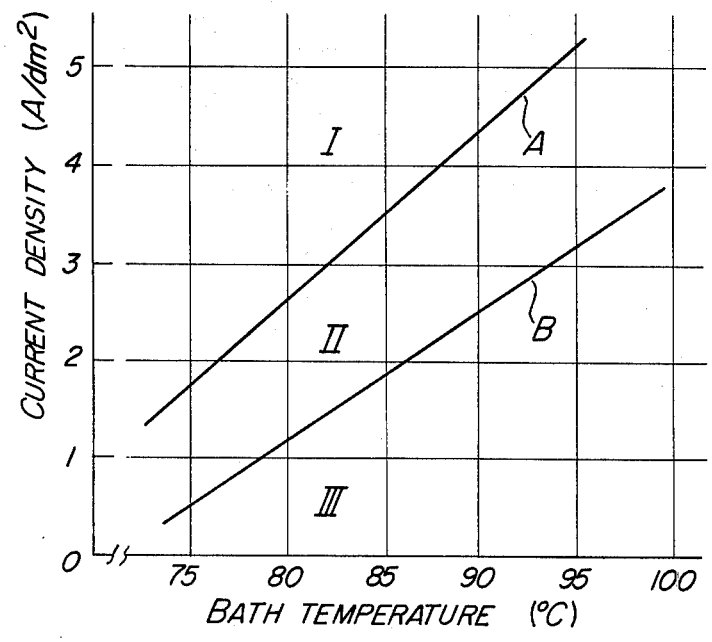
FIG. 2 illustrates the relation between current density and bath temperature for a higher manganese chloride concentration.

The isocurrent efficiency lines are not always such straight lines as shown in the drawing but sometimes becomes curved or broken lines depending on the conditions. For example, the lines are relatively straight when the acid concentration is in the range of 0.1 to 0.7 N but are curved when the acid concentration is more than 0.7 N, and no straight lines can be attained when the manganese concentration is less than 0.5 mole/l. Factors which give the greatest influence to the gradients of the isocurrent efficiency lines are the manganese concentration and the hydrochloric acid concentration. A general tendency is such that the increase of manganese concentration and the decrease of hydrochloric acid concentration make the gradients of isocurrent efficiency lines greater as shown in FIG. 2, whereas the decrease of manganese concentration and the increase of hydrochloric acid concentration make the gradients of isocurrent efficiency lines smaller. In the case of FIG. 2, the electrolysis conditions are such that the hydrochloric acid concentration is 0.1 N and the manganese chloride concentration is 3.0 mole/l.

Typical examples, which show the fact that the proportions of the resulting $\gamma_L$-$MnO_2$ and $\gamma_T$-$MnO_2$ vary depending on the electrolysis conditions, are as set forth in the following table:

| MnCl$_2$ (mole/l.) | HCl (N) | Bath temperature (°C) | Current density (A/dm$^2$) | Apparent current efficiency (%) | $\gamma_L$-MnO$_2$/$\gamma_T$-MnO$_2$ |
|---|---|---|---|---|---|
| 1.0 | 0.4 | 95 | 0.7 | 105 | 100/0 |
| 1.0 | 0.4 | 90 | 0.5 | 104 | 100/0 |
| 1.0 | 0.4 | 80 | 1.0 | 99 | 97/3 |
| 1.0 | 0.4 | 85 | 2.0 | 84 | 86/14 |
| 1.0 | 0.4 | 95 | 2.5 | 90 | 92/8 |
| 1.0 | 0.4 | 85 | 3.0 | 70 | 75/25 |
| 1.0 | 0.4 | 90 | 4.0 | 67 | 70/30 |
| 1.0 | 0.1 | 95 | 1.0 | 108 | 100/0 |
| 1.0 | 0.8 | 95 | 1.0 | 95 | 96/4 |
| 1.0 | 0.3 | 90 | 2.0 | 91 | 93/7 |
| 3.0 | 0.3 | 90 | 2.0 | 105 | 100/0 |
| 0.3 | 0.3 | 90 | 2.0 | 73 | 76/24 |
| 3.0 | 0.1 | 95 | 4.0 | 85 | 88/12 |
| 3.0 | 0.1 | 95 | 3.0 | 104 | 100/0 |

In the next place, the properties of the manganese dioxides of the present invention are mentioned below.

Figure 3A:
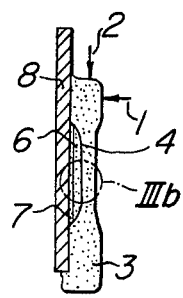
FIG. 3a and 3b are illustrations of cross-sections of electrodeposited manganese dioxide.
Figure 3B:
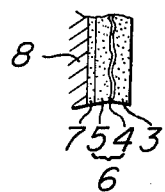

FIG. 3a is a cross-section of manganese dioxide electrodeposited under the conditions in the aforesaid region II. FIG. 3b shows an enlarged cross-section of IIIb part in FIG. 3a. This manganese dioxide can be easily divided into 2 layers at the portion 4. FIG. 4 shows X-ray diffraction patterns of this manganese dioxide, wherein the curve (1) is the diffraction pattern in the case where X-rays were applied from the direction 1 in FIG. 3a, i.e., from the direction vertical to a flat graphite electrode 8; the curve (2) is the diffraction pattern in the case where X-rays were applied from the direction 2 in FIG. 3a; the curve (3) is the diffraction pattern in the case where X-rays were applied to the manganese dioxide at the portion 3 in FIG. 3 which had been ground to −325 mesh; and the curves (4), (5), (6) and (7) are diffraction patterns in the cases where X-rays were applied to portions 4, 5, 6 and 7 in FIGS. 3a and 3b which had been ground to −325 mesh. 6 In FIG. 3b means a mixture of portions 5 and 4.

The manganese dioxide showing the curves (1), (2) and (3) is $\gamma_L$-MnO$_2$, and the manganese dioxide showing the curves (4), (5), (6) and (7) is $\gamma_T$-MnO$_2$.

The curve (8) in FIG. 4 is the diffraction pattern of the conventional electrolytic $\gamma$-MnO$_2$ produced from manganese sulfate solution which had been ground to −325 mesh.

In the $\gamma_T$-MnO$_2$ of the curves (4), (5), (6) and (7), there is observed 1 to 4 % of $\beta$-MnO$_2$, but most of the said manganese dioxide is $\gamma_T$-MnO$_2$ of high oxidation degree. In the conventional $\gamma$-MnO$_2$, the X-ray diffraction pattern of index of plane (110) of ramsdellite is low in intensity and broad, whereas in the $\gamma_T$-MnO$_2$, the said diffraction pattern is high in intensity and extremely sharp. $\gamma$-MnO$_2$ of high oxidation degree which shows such X-ray diffraction pattern has been entirely unknown hitherto.

The $\gamma_L$-MnO$_2$, which has such new properties, electrodeposits with an apparent current efficiency of 102 to 108 % by combining the aforesaid electrolysis conditions, and the $\gamma_T$-MnO$_2$ electrodeposits in the $\gamma_L$-MnO$_2$ when the apparent current efficiency is less than 102 %. The electrolytic deposition mechanism of the $\gamma_T$-MnO$_2$ is not clear at present. However, when a MnCl$_2$ solution is electrolyzed, the anode overvoltage tends to increase under the conditions where the apparent current efficiency is less than 108 %, and chlorine begins to generate at the anode when the apparent current efficiency becomes less than 102 %. From this, it is considered that by the said chlorine at the generation stage at the anode or by chlorine gas or chlorine water, $\gamma_L$-MnO$_2$ which has once been electrodeposited is increased in oxidation degree without being injured in crystal form, with the result that such high oxidation degree manganese dioxide as $\gamma_T$-MnO$_2$ is obtained. Although it is considered that such oxidation reaction accompanies side reactions of forming minute amounts of lower oxides, MnO, Mn$_2$O$_3$ and Mn$_3$O$_4$ cannot be identified from the X-ray diffraction patterns. In the $\gamma_T$-MnO$_2$, however, there are observed unidentifiable X-ray diffraction lines (e.g. 44°, 49°, 56°, 74°, etc.).

Figure 5:
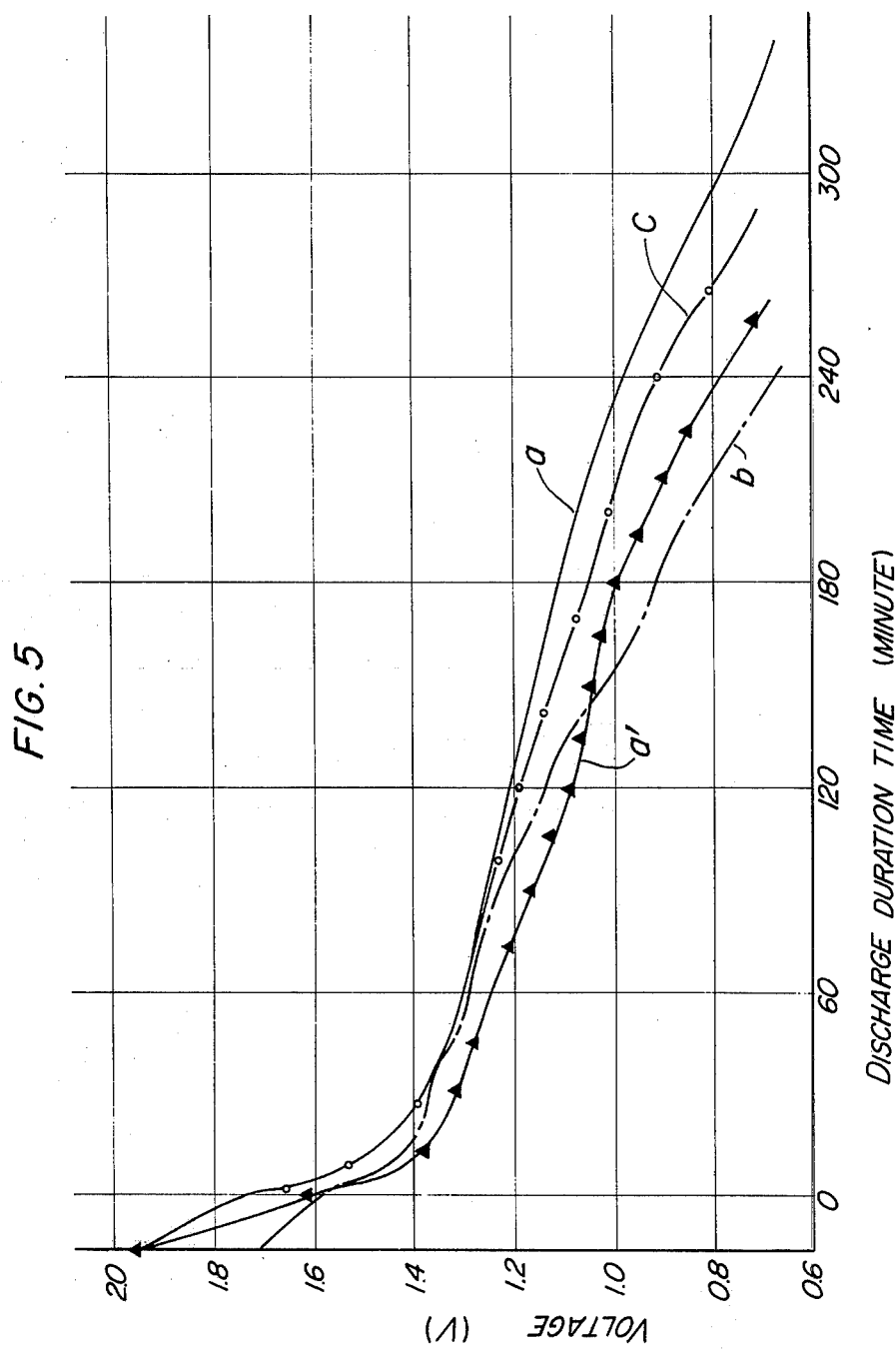
FIG. 5 illustrates the 10 Ω-discharge curves of the UM-3 type dry cells at 20°C.
Figure 6:
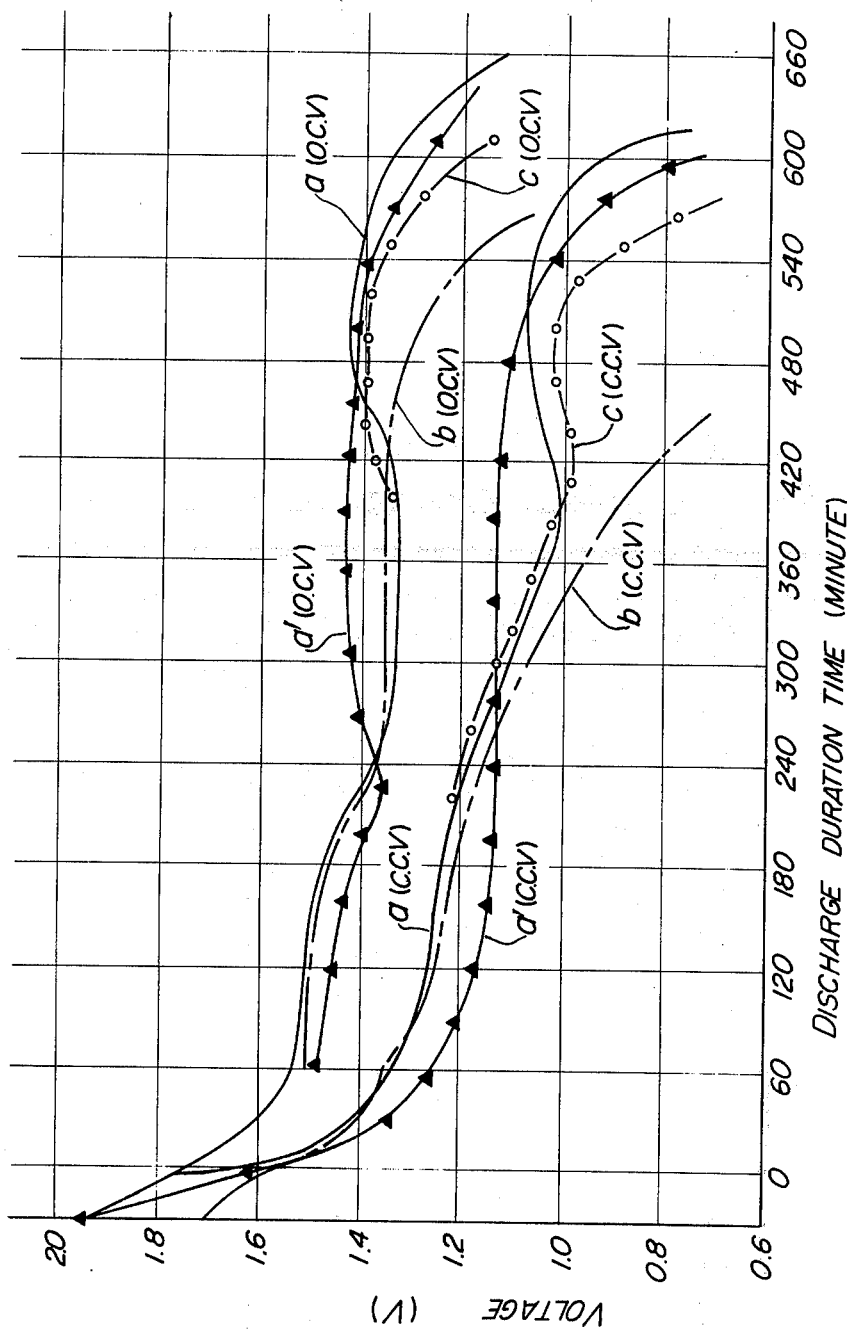
FIG. 6 illustrates the 4 Ω-intermittant discharge curves of the UM-3 type dry cells at 20°C.

Using as a depolarizer each of a manganese dioxide mixture comprising $\gamma_L$-MnO$_2$ and $\gamma_T$-MnO$_2$ which has been obtained under the conditions in the aforesaid region II, and $\gamma$-MnO$_2$ obtained according to a conventional process, UM-1 and UM-3 type (JIS) dry cells were prepared. These cells were compared each other in discharge characteristics to obtain the results as shown in FIGS. 5 to 7. In the drawings, the curve (a) represents the dry cell containing the mixture of $\gamma_T$-MnO$_2$ and $\gamma_L$-MnO$_2$, the curve (a') represents the dry cell containing the $\gamma_T$-MnO$_2$, and the curve (b) represents the dry cell containing the conventional $\gamma$-MnO$_2$, the curve (c) represents the dry cell containing the $\gamma_L$-MnO$_2$.

FIG. 5 shows the 10 Ω continuous discharge curves of the UM-3 type dry cells at 20°C. As is clear from FIG. 5, the cell (a) according to the present invention is high in service voltage on the whole and excellent in efficiency.

FIG. 6 shows the 4 Ω intermittent (30 min./day, 6 days/week) discharge curves of the UM-3 type dry cells at 20°C, and FIG. 7 shows the intermittent discharge curves of the UM-1 type dry cells under the said conditions. As is clear from FIGS. 6 and 7, in the case of the cells (a) according to the present invention in which is used manganese dioxide, both the closed circuit voltage (C.C.V.) and the open circuit voltage (O.C.V.) recover the potentials when the closed circuit voltage becomes close to about 1.0 V to show characteristic discharge curves which have not been observed hitherto.

The reason why the cells using manganese dioxide of the present invention show such excellent discharge characteristics at the time of intermittent discharge has not been clarified yet, but is considered to be as follows:

When the closed circuit voltage is up to about 1.1 V, MnO$_2$ composed of $\gamma_L$-MnO$_2$ and $\gamma_T$-MnO$_2$ discharges according to a homogeneous reaction represented by the equation (2), like in the case of the conventional $\gamma$-$MnO_2$, but when the closed circuit voltage becomes near to about 1.1 V, the $MnO_2$ brings about such a heterogeneous reaction as represented by the equation (3), so that both the open circuit and closed circuit voltages are recovered to greatly prolong the discharge duration time up to 0.85 V.

$$2MnO_2 + 2H^+ + 2e \rightarrow Mn_2O_3 \cdot H_2O \quad (2)$$

$$2MnOOH + 2H^+ \rightarrow Mn^{2+} + MnO_2 + 2H_2O \quad (3)$$

The reaction of the equation (3) can be substantiated by the fact that as the result of analysis, the amount of $Mn^{2+}$ contained in the depolarizing mixture of the cell after completion of discharge was 4 to 10 times more than in the case of a conventional product, though the value somewhat varies depending on the discharge rate.

When only $\gamma_L$-$MnO_2$ is used as the depolarizer, both the utilization ratio and the duration time decrease by about 5 to 10 % as shown by curves (c) in FIGS. 5 to 7, and the recovery phenomenon of potential at the time of intermittent discharge is not so marked.

As mentioned above, the cell which contains $\gamma_T$-$MnO_2$ as a depolarizer has a high capacity and is excellent in especially intermittent discharge characteristic. This $\gamma_T$-$MnO_2$, as mentioned before, is characterized in that it has apparently an orientation, is somewhat softer than $\gamma_L$-$MnO_2$, has deep black color, has a peak indicating an index of plane (110) of ramsdellite in the X-ray diffraction pattern at 28° with a strong intensity, has dull diffraction lines at 44°, 49°, 56° and 74° of 2 $\theta$, contains 94 – 98.5 % of effective oxygen and x in $MnO_x$ is 1.970 – 1.990.

Said manganese dioxide can be produced by carrying out an electrolysis under such conditions as hydrochloric acid concentration of 0.01 – 1.0 mole/l., manganese chloride concentration of 0.2 – 6.0 mole/l., bath temperature of 70° – 99°C, current density of 0.3 – 5 $A/dm^2$, so that apparent current efficiency becomes less than 102 %, preferably 60 to 102 %, i.e., under the conditions in the aforesaid regions I and II, preferably in the region II.

The electron photomicrograph (x 10000) of FIG. 8A shows surface of $\gamma_L$-$MnO_2$ block electrodeposited on an electrode and was taken from the direction perpendicular to the electrode. The electron photomicrograph (x 1000) of FIG. 8A' shows sectional surface obtained by cutting the $\gamma_L$-$MnO_2$ block in the direction perpendicular to the electrode and in the longitudinal direction and was taken from the direction perpendicular to this surface. The electron photomicrographs (x 10000) and (x 1000) of FIGS. 8B and 8B' show surface of conventional $\gamma$-$MnO_2$ block electrodeposited by electrolysis of manganese sulfate bath and were taken in the same manner as said FIGS. 8A and 8A', respectively.

As is clear from these microphotographs, $\gamma_L$-$MnO_2$ of the present invention is crystal having directional property, namely, is excellent in crystallinity.

Electron photomicrograph of $\gamma_T$-$MnO_2$ shows substantially the same surface state as that of $\gamma_L$-$MnO_2$ shown in FIG. 8A and 8A', namely, shows the similar vertical stripes to those of $\gamma_L$-$MnO_2$.

As mentioned before, $\gamma_T$-$MnO_2$ of present invention is high in utilization efficiency as a depolarizer of cells and is reduced to $ZnO \cdot Mn_2O_3 \cdot H_2O$ (zinc manganite) by discharging. On the other hand, the conventional electrolytic $MnO_2$ or chemically synthesized $MnO_2$ is not reduced to $ZnO \cdot Mn_2O_3 \cdot H_2O$ and is low in utilization efficiency. The reasons therefor can be considered that not only $\gamma_T$-$MnO_2$ is excellent in crystallinity and chemically active, but also it contains chlorine ion in crystal as explained before. That is, in case of Leclanche type cell, when $Zn^{++}$ in electrolyte or $Zn^{++}$ produced by discharging of zinc anode diffuses to depolarizer layer, if chlorine ion is present in $MnO_2$, $Zn^{++}$ easily diffuses into $MnO_2$, too and thus, deep portion of $MnO_2$ also can take part in electromotive reaction.

On the other hand, $\gamma$-$MnO_2$ obtained by electrolysis of manganese sulfate bath contains $SO_4^{--}$, which reacts with $Zn^{++}$ which diffuses to surface of $MnO_2$ to form $ZnSO_4$. Thus, $Zn^{++}$ does not diffuses into deep portion of $MnO_2$ and the deep portion of $MnO_2$ cannot take part in electromotive reaction. This is because $ZnCl_2$ has high solubility while $ZnSO_4$ has low solubility.

Moreover, the discharge reaction of manganese dioxide is represented by the equation $2MnO_2 + 2e \rightarrow Mn_2O_3 \cdot H_2O$ and excellent crystallinity of $MnO_2$ means that $H^+$ (proton) can easily duffuse in the solid phase of $MnO_2$ and e (electron) also can easily pass therethrough. Therefore, discharge reaction smoothly proceeds and a high utilization efficiency can be attained.

Purity of $MnO_2$ is measured in accordance with the method specified in K1467-1955 of Japanese Industrial Standard (JIS), which is called oxalic acid method, namely, the purity is obtained from amount of oxygen required for oxidation of oxalic acid. This amount of oxygen is the effective oxygen content and the greater the amount is, the more excellent $MnO_2$ is as depolarizer.

Furthermore, $MnO_2$ of the present invention is excellent as a catalyst for purification of waste gas. This is because $MnO_2$ of the present invention has excellent crystallinity. That is, the reaction of conversion of carbon monoxide (CO) in the waste gas into carbon dioxide by combining of CO with oxygen in air at surface of the catalyst is as follows: When oxygen is adsorbed onto surface of manganese dioxide particles (catalyst), said oxygen is dissociated in the manner of $O_2 \rightarrow 2O^+ + 2e$. This electron freely moves through the catalyst and when interface of crystals of the catalyst particles is smaller, namely, crystallinity is more excellent, electron can more easily move through the catalyst. The surface of catalyst in such state tends to adsorb CO selectively and furthermore $O^+$ of oxygen adsorbed to one point of the surface of the catalyst and CO adsorbed to other portions easily form active complex to convert CO into $CO_2$. Thus, since the manganese dioxide of the present invention is excellent in crystallinity, it is excellent in catalytic ability of converting CO into $CO_2$.

What is claimed is:

1. A composition of $\gamma_T$-manganese dioxide of the formula $\gamma_T$-$MnO_x$ having a peak indicating an index of plane (110) of ramsdellite in its X-ray diffraction pattern at 28° with a strong intensity, x in $MnO_x$ is 1.970 – 1.990 and it contains 94 – 98.5% of an effective oxygen and 0.05 – 0.3% by weight of chlorine in the form of chlorine ion and containing 1–4% by weight of B-$MnO_2$.

2. A manganese dioxide composition according to claim 1, which additionally comprises $\gamma_L$-manganese dioxide of the formula $\gamma_L$-$MnO_x$ having a crystal structure similar to fiber structure and in orientation, x in $MnO_x$ is 1.950 – 1.970 and it contains 90 – 94% of an effective oxygen.

* * * * *